United States Patent
Cook et al.

(10) Patent No.: US 7,310,523 B1
(45) Date of Patent: Dec. 18, 2007

(54) WIRELINE TERMINAL ACCESSING MOBILE TELEPHONE SERVICES

(75) Inventors: Fred S. Cook, Olathe, KS (US); Lynn A. Neir, Lenexa, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 136 days.

(21) Appl. No.: 11/055,314

(22) Filed: Feb. 10, 2005

(51) Int. Cl.
*H04Q 7/20* (2006.01)

(52) U.S. Cl. .................. 455/426.1; 455/445; 455/456; 455/435; 379/58; 379/59; 379/207.02

(58) Field of Classification Search ................ 455/445, 455/560, 554.1, 435.1, 426.1, 435, 456; 379/211.02, 379/59, 207.2, 58
See application file for complete search history.

(56) References Cited

U.S. PATENT DOCUMENTS

| | | | |
|---|---|---|---|
| 4,575,840 A | | 3/1986 | Hargrave et al. |
| 5,396,543 A | | 3/1995 | Beeson, Jr. et al. |
| 5,526,403 A | | 6/1996 | Tam |
| 5,659,596 A | | 8/1997 | Dunn |
| 5,901,359 A | | 5/1999 | Malmstrom |
| 5,933,778 A | | 8/1999 | Buhrmann et al. |
| 6,038,451 A | * | 3/2000 | Syed et al. .................. 455/445 |
| 6,052,592 A | | 4/2000 | Schellinger et al. |
| 6,122,508 A | | 9/2000 | Veloso |
| 6,459,908 B1 | | 10/2002 | Cook et al. |
| 6,539,237 B1 | | 3/2003 | Sayers et al. |
| 6,711,417 B1 | | 3/2004 | Gorman et al. |
| 6,807,431 B2 | | 10/2004 | Sayers et al. |
| 6,816,735 B1 | | 11/2004 | Rayburn et al. |
| 7,130,628 B2 | * | 10/2006 | Yu et al. ................... 455/435.1 |
| 2001/0046839 A1 | | 11/2001 | Latva-Aho et al. |
| 2004/0072593 A1 | * | 4/2004 | Robbins et al. ............. 455/560 |
| 2004/0203788 A1 | | 10/2004 | Fors et al. |
| 2004/0235500 A1 | | 11/2004 | Dombkowski et al. |
| 2005/0026650 A1 | * | 2/2005 | Russell ..................... 455/554.1 |
| 2005/0111649 A1 | * | 5/2005 | Belkin et al. .......... 379/211.02 |

* cited by examiner

*Primary Examiner*—Joseph Feild
*Assistant Examiner*—Michael Vu

(57) ABSTRACT

A telecommunication system establishes location information concurrently with the set-up of a landline as a network address for delivering wireless-based subscription services. A location register in the wireless system defines a current network location where a respective subscriber is connected and a current geographic location where said respective subscriber is located. An access device is provided for coupling with a landline within the public switched telephone network, wherein the landline has a landline ID, and wherein a user terminal connected to the landline is associated with a fixed geographic location. A control channel transmits an electronic identification number of a subscriber and a location coordinate corresponding to the fixed geographic location from the access device to the location register during registration of the landline as the current network address of the user terminal. The subscriber receives location-based wireless services via the landline.

15 Claims, 3 Drawing Sheets

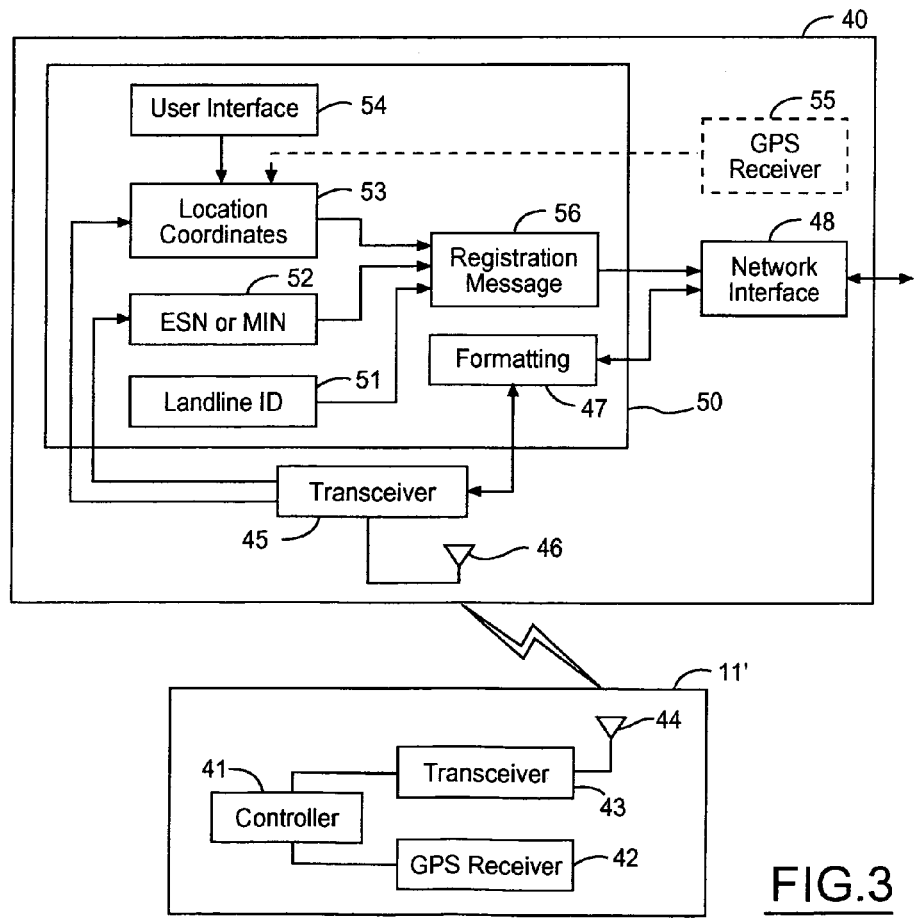

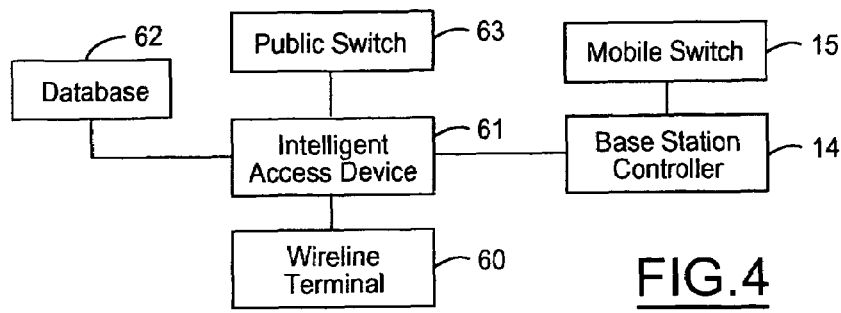
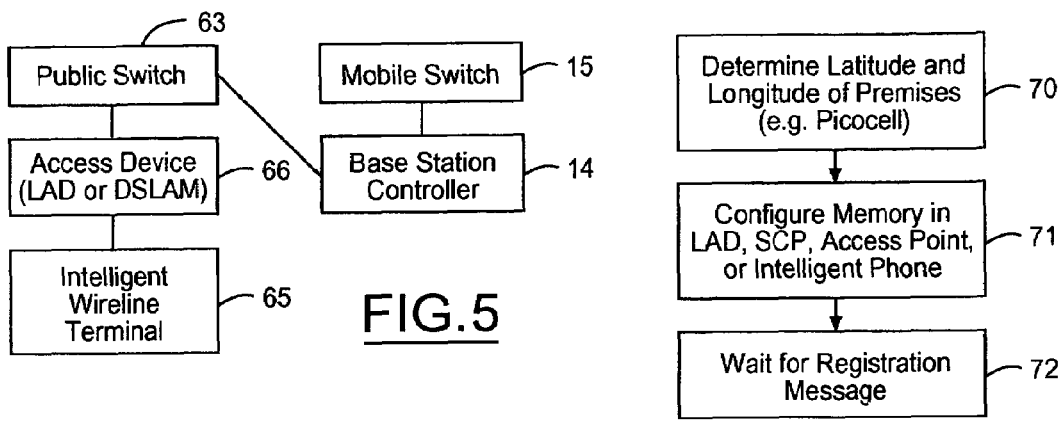
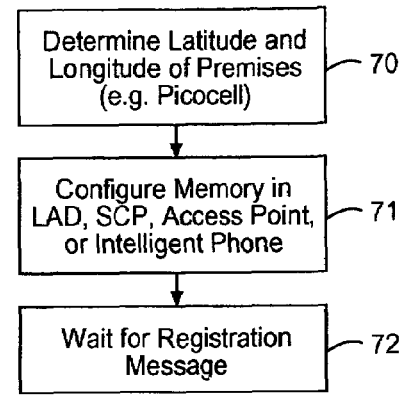
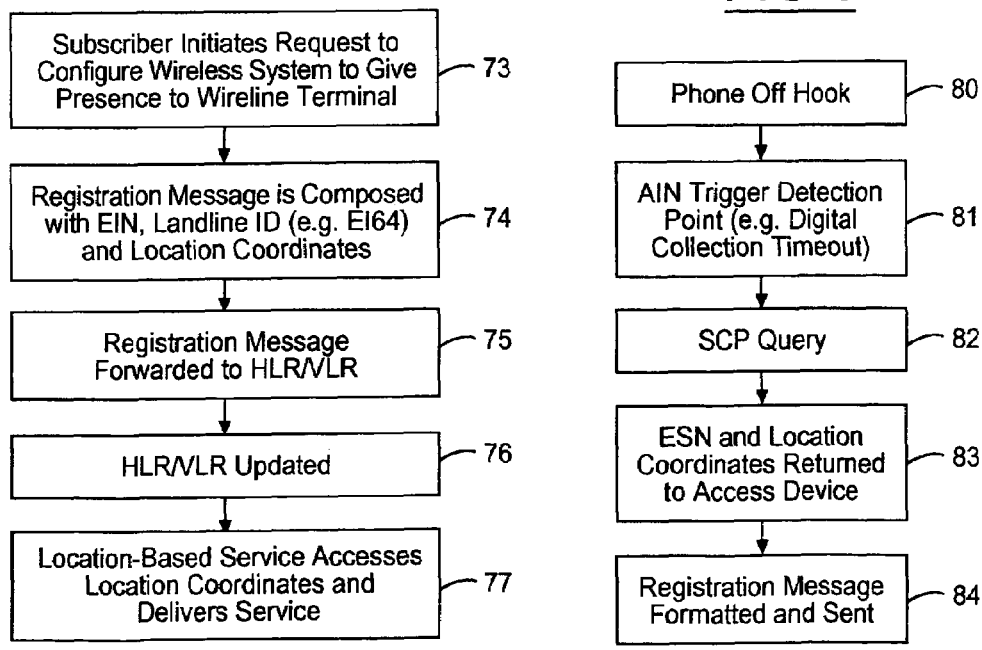
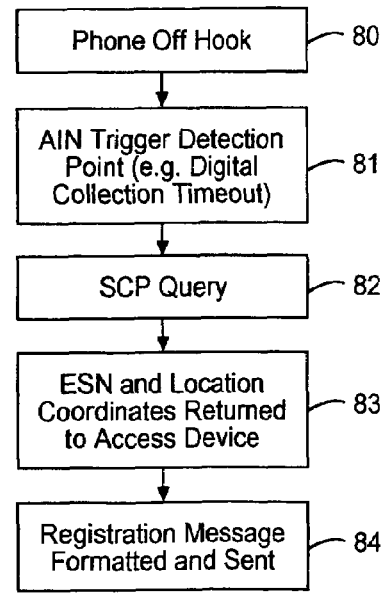

WIRELINE TERMINAL ACCESSING MOBILE TELEPHONE SERVICES

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to wireless telecommunications services, and, more specifically, to providing location-based cellular telecommunications services to a wireless subscriber when located at a wireline terminal.

A variety of different types of networks exist in today's telecommunication environment. One type of common network is a wireless telecommunication network, commonly referred to as a cellular telephone network. In wireless networks, switching is performed by mobile switching centers (MSC). Each MSC typically controls one or more base stations or base transceiver stations (BTS), sometimes via one or more base station controllers (BSC). Each BTS provides a wireless coverage area within which mobile switching centers can communicate with wireless devices over an air interface. The wireless devices can be cellular or PCS telephones, or other devices. Different formats may be used for communicating over the air interface. The most commonly used formats in the United States are AMPS, TDMA, and CDMA.

Each wireless device typically has a "home" wireless network in which a home location register (HLR) serves as a centralized database of information about the wireless device. Typically, the HLR contains a service profile for the wireless device, the last reported location of the wireless device, and the current status of the wireless device. The service profile indicates the services to which the wireless device subscribes. Typically, the HLR also has access to the service logic needed to provide the subscribed services.

When an MSC needs to find information about a wireless device, such as where the wireless device is located or the services to which the wireless device subscribes, the MSC queries the HLR corresponding to that wireless device. Thus, to inquire about a wireless device that is roaming, i.e., operating on a network other than its home network, the MSC queries an HLR that is outside of its network. Typically, an MSC determines the proper HLR to query based on an electronic identification number comprising the mobile identification number (MIN) and/or the electronic serial number (ESN) transmitted by the wireless device. Information retrieved relating to roaming devices is stored in a visitor location register (VLR) database.

Broadband packet networks represent another type of network. For example, asynchronous transfer mode (ATM) networks have been developed to provide broadband transport and switching capability to Local Area Networks (LAN) and Wide Area Networks (WAN). Frame relay networks are another type of broadband packet network. Other types of broadband packet networks are possible as well.

The public switched telephone network (PSTN) is still another type of network. The PSTN includes switches which can route both voice and data communications between end users. Typically, these switches are Class 4 or Class 5 switches.

Different types of networks are often connected to each other. For example, wireless networks can be connected to broadband networks. Both can be connected to the PSTN. There is a need to interconnect these different types of networks such that devices in one network can communicate with devices in other networks. A need also exists to allow a wireless device for a cellular network (e.g., a PCS handset) to work as a terminal device on a broadband network (e.g., a wireless LAN) in a particular location. The wireless LAN may provide both voice and data connectivity to a dual network wireless device in a picocell arrangement. When a dual network device moves between the picocell and the wide area wireless network, there is a need to hand-off calls between the networks and to inform the various networks of where an end user can currently be reached. One example interface for utilizing a dual networking device on a picocell wireless network to access other networks is shown in U.S. Pat. No. 6,711,417, issued to Gorman et al on Mar. 23, 2004, which is incorporated herein by reference in its entirety.

In a typical wireless data communication session, a user of a mobile station may direct the mobile station to send data via the air interface and radio access system to a data server (e.g., web server) on the Internet or other data network, and the data server may send data via the radio access system and air interface back to the mobile station. To facilitate such data communications, many mobile stations are now equipped (e.g., programmed) with a microbrowser application which enables a user to engage in a scaled down version of the same sort of web browsing that is conventionally conducted from a desktop personal computer. In practice, the user typically interacts with the microbrowser through a display screen and keypad on the mobile station. The microbrowser exchanges instructions with a server to perform functions requested by the user, and it may also interpret instructions received by the server that describe the layout and content of the microbrowser screen or that request the microbrowser to query the user for information.

The ability to engage in data sessions at mobile stations has opened up a myriad of possibilities. Mobile station users can now access a wide variety of information services from almost anywhere where mobile communications are supported. The information services can take a variety of forms, including, for instance, stock quotes, sports scores, weather reports, traffic reports, emergency notifications, and information about locations of facilities such as restaurants, hotels, and gas stations.

Some of the information services that a user might access from a data-capable mobile station are location-based. For instance, an information service might be arranged to provide weather or traffic conditions for a particular geographic region, or to provide the street addresses of a designated type of restaurant. These and other location-based services may be keyed to the exact location of the mobile station, so that a user of the mobile station can access the information service and obtain information pertinent to the user's present location. For instance, a web service provider might allow a user to query a data server for the addresses of all pizza restaurants or fueling stations within a predetermined distance of the user's current location, with the server then providing turn-by-turn directions to the destination in response to the user's current location. In these location-based services, the data server sends the requested location-based information to the microbrowser, and the microbrowser may cause the information to be displayed for viewing by the user.

Alternatively, the location-based service may involve having the data server take a location-based action even without providing location-based information to the mobile station for presentation to the user. For example, based on the fact that a mobile station is in a particular location, the data server might send a particular message to some other entity or take some other responsive action.

To facilitate such location-based services, the HLR in the wireless system maintains current location information on the subscriber. For services requiring only an approximate location, then the location of the base station currently in contact with the wireless device may be sufficient location information. Many services, however, require more exact information, so that the HLR maintains a more exact position of the user based on current geographic coordinates (e.g., latitude and longitude). The position information may be obtained using a global positioning system (GPS) receiver contained in most cellular phones. This information is broadcast over the wireless link to the MSC and then populated into the HLR database for use in providing location-based services.

The functionality of the location-based services has not been available to the user of a dual-mode wireless device when connected to a prior art picocell or other wireless LAN via a wireless access point. Even in existing systems that report the landline network address (e.g., E164 address or POTS telephone number that connects the picocell to the PSTN) to the HLR (to allow the subscriber to continue to receive calls to their mobile telephone number while they are connected to the picocell, for example), the geographic location of the user is not available to the HLR and location-based services are not supported.

SUMMARY OF THE INVENTION

The present invention enables a wireless subscriber of location-based services to receive the services via a landline connection when they are not actively connected to their wireless communication system.

In one aspect of the invention, a telecommunication system establishes location information concurrently with the set-up of a landline as a network address for delivering wireless-based subscription services. A mobile switch is provided for coupling with a public switched telephone network and a plurality of wireless base stations to direct wireless services to subscribers thereof. A location register is provided for defining a current network location where a respective subscriber is connected and a current geographic location where said respective subscriber is located. The respective subscriber is associated with a wireless device having an electronic identification number. An access device is provided for coupling with a landline within the public switched telephone network, wherein the landline has a landline ID, and wherein a user terminal connected to the landline is associated with a fixed geographic location. A control channel transmits the electronic identification number and a location coordinate corresponding to the fixed geographic location from the access device to the location register. The location register stores the location coordinate as the current geographic location associated with the electronic identification number, whereby the subscriber receives location-based wireless services via the landline.

BRIEF DESCRIPTION OF THE DRAWINGS

FIG. 2 is a table showing an HLR database.

FIG. 3 is a block diagram showing a wireless phone and an integrated service hub/wireless access point in greater detail.

FIG. 4 is a block diagram showing an alternative embodiment for transmitting registration information to the wireless system.

FIG. 5 is a block diagram showing yet another alternative embodiment for transmitting registration information to the wireless system.

FIG. 6 is a flowchart showing a method for configuring geographic location information to be used during registration.

FIG. 7 is a flowchart showing a method for registering a location and providing location-based services to a subscriber via a landline.

FIG. 8 is a flowchart showing a method for initiating a registration message without requiring intelligence at the landline terminal itself.

DETAILED DESCRIPTION OF PREFERRED EMBODIMENTS

Figure 1:
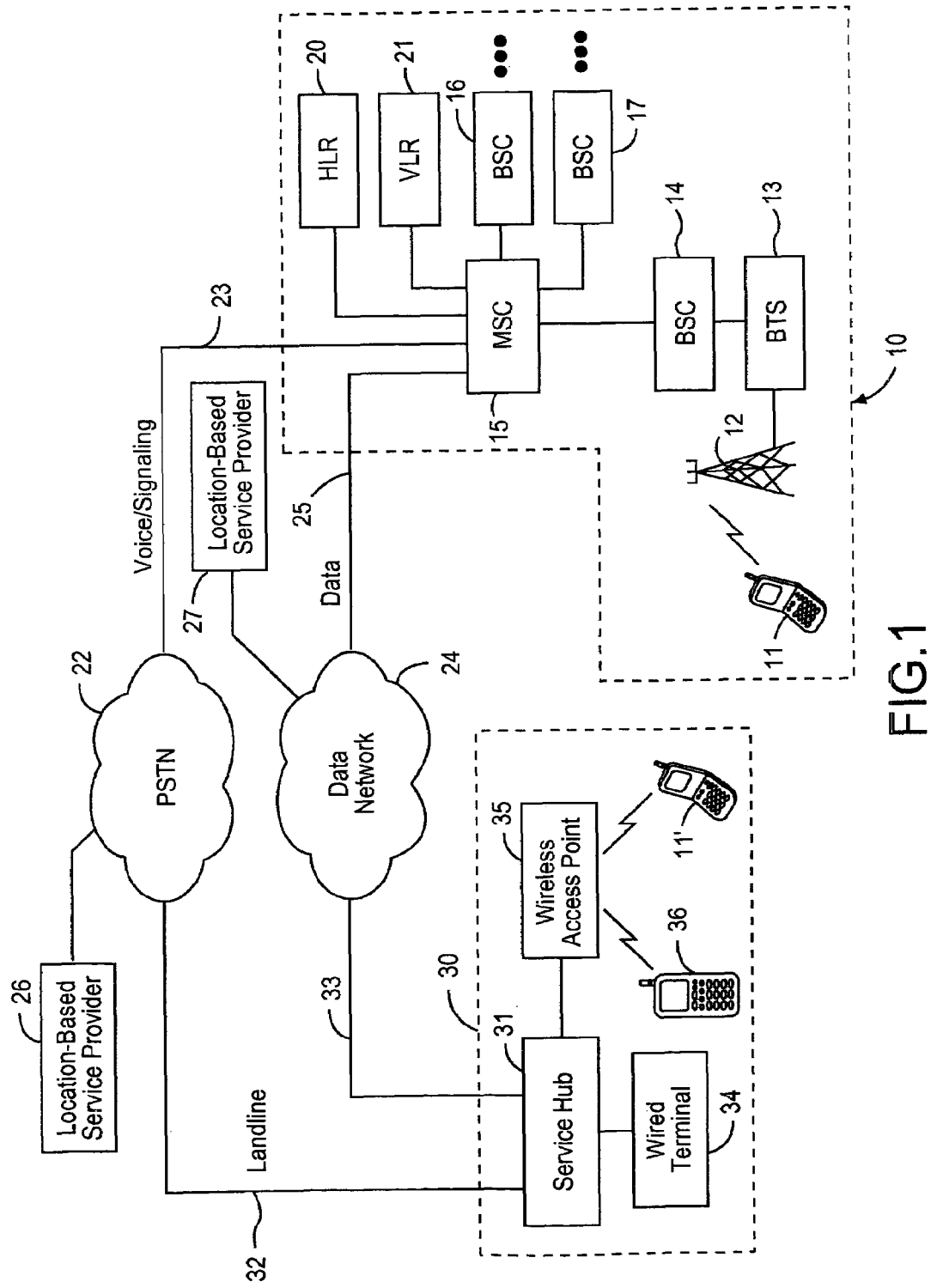
FIG. 1 is a block diagram showing a preferred embodiment of a network architecture of the present invention for registering a mobile phone user at a landline location.

Referring to FIG. 1, a wireless network 10 provides cellular service to a mobile wireless terminal 11. Wireless terminal 11 communicates over an air link with a cellular tower 12 connected to a base transceiver station (BTS) 13. A base station controller (BSC) 14 is coupled to BTS 13 and a mobile switching center (MSC) 15. MSC 15 is typically coupled to many base station controllers such as BSC 16 and BSC 17 for controlling additional cells. A home location register (HLR) 20 and a visitor location register (21) are coupled to MSC 15 in a conventional manner. MSC 15 is coupled to a public switched telephone network (PSTN) 22 by a voice/signaling link 23 and a data network 24 (e.g., the Internet) by a data link 25.

A wireless subscriber using terminal 11 is capable of receiving voice and data services through MSC 15 from providers that are accessible via PSTN 22 and data network 24. If the wireless subscriber using terminal 11 is a subscriber to the cellular provider operating BSC 14 and MSC 15, then the associated subscriber information is stored in KLR 20. If the wireless subscriber using terminal 11 is not a subscriber to the cellular provider operating BSC 14 and MSC 15 (i.e., is roaming), then the associated subscriber information is retrieved from an HLR of the subscriber's home system and stored in VLR 21.

Location-based services may be provided by a location-based service provider 26 connected to PSTN 22 and by a location-based service provider 27 connected to data network 24. In providing their location-based services, providers 26 and 27 access geographic location information corresponding to terminal 11 from HLR 20 in a conventional manner.

A fixed installation 30 includes a service hub 31 connected to PSTN 22 via a landline 32 and connected to data network 24 via a data link 33. At least one wired terminal 34 is connected to service hub 31 for obtaining voice services. In a typical residential or business installation, there may be a plurality of wired terminals either sharing the same telephone number (i.e., E164 network address) or having a plurality of separate telephone numbers (e.g., when service hub 31 is a PBX). Data and voice services are also provided via service hub 31 and wireless access point 35 to wireless devices 36 and 11' in a picocell arrangement. Wireless device 36 may comprise a wireless LAN terminal operating pursuant to IEEE standard 802.11, as is known in the art.

Wireless device 11' may be a dual mode cellular telephone that connects to wireless access point 35 when in the vicinity of installation 30 using an 802.11 transceiver.

In order to maintain the subscriber's presence in the wireless cellular system while being exclusively connected to fixed installation 30, HLR 20 can be updated to reflect the landline network address (i.e., E164 telephone number) as the current network location of the subscriber in a known manner. A control channel is established from the landline subscriber end to the MSC for transferring (i.e., uploading) the appropriate registration information. Preferably, MSC 15 is modified to accept the registration information directly from the control channel, in which case the control channel comprises a data link that may be established through either data network 24 or PSTN 22 from service hub 31 to MSC 15. The identity (e.g., network address) of MSC 15 is registered in service hub 31 (e.g., manually configured or downloaded from terminal 11') in order to establish the control channel through the appropriate network. In some instances, it may be desirable to identify an MSC of a provider other than the one to which the wireless subscriber belongs. Based on the ESN or MIN, the MSC determines that it will use the VLR rather than the HLR for storing registration information of the present invention. In addition, the MSC will contact the home MSC to determine what services the subscriber has been authorized to obtain.

Referring to FIG. 2, BLR database 20 includes data fields for a subscriber mobile identification number (MIN), an electronic serial number (ESN) of the subscriber's cellular device, service codes corresponding to subscribed services, a network location, and a geographic location. An example record 38 includes a mobile phone number "123-456-7899" for the MIN and a serial number "tuvwxyz" for the ESN. Service codes "aa", "bb", and "cc" identify the subscribed services (e.g., weather services, emergency notification services, voicemail services, etc.). The network location may comprise one of two address types depending upon the current connection of the subscriber. If the subscriber is currently connected to the cellular network, then the network location comprises an identification of the base transceiver station with which the subscriber's wireless device is currently communicating (during a call the identification may also include a channel being used by the subscriber). When the subscriber is connected via a fixed installation, the network location comprises a landline ID (e.g., the line number assigned to the particular landline subscriber loop). Geographic location comprises latitude and longitude coordinates where the subscriber's active terminal is currently located. The active terminal may be the subscriber's cellular phone, another wireless device, or a wireline terminal at the subscriber's discretion.

FIG. 3 shows an embodiment of the invention wherein the service hub and wireless access point are integrated into a cable modem/router 40 as a single unit (e.g., and integrated access device or IAD) for wireless LAN communication with wireless terminals including dual-mode cellular terminal device 11'. A controller 41 in cellular device 11' is connected to a GPS receiver 42 and a transceiver 43 (e.g., an 802.11 transceiver). Cellular device 11' further includes an antenna 44 coupled to transceiver 43 for exchanging wireless signals with an antenna 46 connected to a transceiver 45 in modem/router 40. Digital data corresponding to voice and data services are exchanged between transceiver 45 and a data formatting block 47 within a controller 50. Formatting block 47 is connected to a network interface 48 that exchanges data packets with a communications network (e.g., PSTN 22 and/or data network 24).

Controller 50 includes a nonvolatile memory for storing a landline ID 51, an electronic identification number 52 (such as an ESN or an MIN), and location coordinates 53. To support location-based services, location coordinates 53 preferably comprise the latitude and longitude coordinates of the location of the picocell coverage area. In one embodiment, the location coordinates can be obtained by GPS receiver 42 in cellular terminal 11' and transferred to controller 50 as wireless data. Alternatively, the location coordinates can be manually entered through a user interface 54 (e.g., as part of a set-up procedure at the fixed installation). In yet another embodiment, a dedicated GPS receiver 55 can be provided in modem/router 40 for detecting the location coordinates.

Landline ID 51 is preferably manually configured during the set-up procedure of modem/router 40 at the fixed installation (e.g., by specifying one or more line numbers using user interface 54). The ESN or MIN data stored in controller 50 can preferably be wirelessly transferred from cellular terminal device 11' during an initial registration and set-up of a communication session between them. During set-up of the local session between cellular terminal 11' and modem/router 40 or anytime thereafter, the sending of a registration message to the wireless cellular system can be initiated either automatically or manually. A registration message comprising a landline ID (e.g., POTS phone number), an electronic identification number (e.g., the ESN or MIN used by the subscriber), and geographic location coordinates (e.g., latitude/longitude) are formatted into a desired format in a registration message block 56 and forwarded to the MSC via network interface 48. Once the MSC updates the HLR, location-based wireless services can be provided to the subscriber without accessing the wide-area wireless cellular network by using the landline connection (e.g., to the picocell).

FIG. 4 shows an alternative embodiment not using a picocell arrangement. A wireline terminal 60 lacking the electronic intelligence necessary to register the landline with the HLR is connected to an intelligent access device 61 which may be comprised of a line access device (LAD) or a DSLAM located in a central office together with a public switch 63. Intelligent access device 61 is coupled to a database 62 for correlating a landline ID with geographic location coordinates and an electronic identification number for a cellular subscriber (ESN or MIN). Intelligent access device 61 is coupled by a data link to BSC 14. By providing wireless registration information through BSC 14 to MSC 15, modifications to MSC 15 for accepting the registration information become unnecessary since the control channel uses the same interface into MSC 15 as is used when the subscriber is connected to the wireless cellular system. Database 62 may be contained as part of a service control point (SCP) that may be configured by a network administrator or to a limited extent by the subscriber.

An alternative embodiment is shown in FIG. 5 wherein an intelligent wireline terminal 65 stores the registration information and initiates the transmission of a registration message to the MSC, but wherein only a voice channel is available from terminal 65 to an access device 66. Consequently, public switch 63 generates corresponding digital data for transmission to BSC 14 using the appropriate data format.

A preferred method for configuring the memory for storing location coordinates is shown in FIG. 6. The latitude and longitude of the premises (e.g., the picocell coverage area) are determined in step 70. In step 71, a memory for storing the location coordinates (e.g., memory in the line access device, SCP, wireless access point, or intelligent telephone instrument) is configured with the determined coordinates. The intelligent device for sending a registration message waits for a registration request in step 72.

A preferred method for the registration process is shown in FIG. 7. A subscriber initiates a request to configure the wireless system to give a presence within the wireless system to a wireline terminal in step 73. In step 74, a registration message is composed with the electronic identification number (e.g., ESN or MIN), the landline ID, and the location coordinates. A registration message is forwarded in step 75 to a target MSC. In step 76, the HLR or VLR is updated with the registration information. Once the current geographic location information is propagated to its expected location in the HLR or VLR, a location-based service provider can access the location coordinates and then deliver their location-based services to the subscriber in step 77.

FIG. 8 shows a preferred method for initiating a registration message from a landline location having only a "dumb" terminal without capacity to generate any control signaling. This method could employ the equipment shown in FIG. 4 wherein the intelligent access device (e.g., supporting advanced intelligent network (AIN) operation) is located at a central office in conjunction with a database included as part of an SCP. The database is set-up in advance to include location coordinates and a default ESN associated with a particular wireline telephone number, for example. A predetermined user action at the wireline terminal initiates a request to configure the wireline system to give the wireline terminal a presence on the wide-area wireless system. For example, the user/subscriber takes the telephone instrument off-hook in step 80 and leaves it off-hook for longer than the normal dialing interval. In step 81, the delay reaches an AIN trigger detection point such as the digit collection timeout (as defined in AIN release 0.1). In response to the trigger detection, an SCP query is generated in step 82 by the access device (e.g., IAD or LAD) for determining the proper control action to be taken. In step 83, the ESN and location coordinates are returned to the access device along with instructions to relay a registration message to a preconfigured MSC. The registration message is formatted and sent in step 84, whereby both a registered network location reflecting the landline phone number and a registered geographic location of the landline premises are available to support the delivery of location-based services to the subscriber using the landline connection.

To increase flexibility, the user may be allowed to manually provide an ESN for other than the one for the default wireless terminal. Thus, the access device sends a query (e.g., synthesized voice prompt from an IVR) to the user whether to use the default ESN. If the user indicates that a different ESN is to be used (e.g., by pressing a corresponding button on the dialpad), then an alternate ESN may be entered using the dialpad.

What is claimed is:

1. A telecommunication system comprising:
    a mobile switch for coupling with a public switched telephone network and a plurality of wireless base stations in a wireless network, said mobile switch directing wireless services to subscribers thereof;
    a location register defining a current network location where a respective subscriber is connected and a current geographic location where said respective subscriber is located, said respective subscriber being associated with a wireless device having an electronic identification number used in said wireless network;
    an access device for coupling a user terminal to a landline within said public switched telephone network, wherein said landline has a landline ID, and wherein said respective subscriber becomes associated with a fixed geographic location when using said user terminal coupled to said access device; and
    a control channel transmitting said electronic identification number and a location coordinate corresponding to said fixed geographic location from said access device to said location register when said respective subscriber moves an active connection from said wireless network to said public switched telephone network;
    wherein said location register stores said location coordinate as said current geographic location associated with said electronic identification number, whereby said subscriber receives location-based wireless services via said landline.

2. The system of claim 1 wherein said access device comprises a wireless access point in a picocell arrangement.

3. The system of claim 2 wherein said wireless access point includes a memory configurable to store said location coordinate.

4. The system of claim 2 wherein said wireless access point includes a detector for automatically determining said location coordinate.

5. The system of claim 2 wherein said wireless device comprises a cellular telephone including a detector for automatically determining said location coordinate, and wherein said location coordinate is wirelessly transmitted to said wireless access point.

6. The system of claim 5 wherein said detector comprises a GPS receiver.

7. The system of claim 1 wherein said mobile switch is operated by a service provider with which said subscriber is directly subscribed and wherein said location register comprises a home location register.

8. The system of claim 1 wherein said mobile switch is operated by a service provider with which said subscriber is not directly subscribed and wherein said location register comprises a visitor location register.

9. The system of claim 1 wherein said wireless device comprises a cellular telephone and wherein said electronic identification number is selected from the group comprising an electronic serial number (ESN) and a mobile identification number (MIN).

10. The system of claim 1 wherein said access device is located as part of a central office in said public switched telephone network, and wherein said access device is responsive to a predetermined action on said landline to initiate said transmission on said control channel.

11. The system of claim 10 wherein said access device is part of an advanced intelligent network (AIN) and wherein said predetermined action corresponds to a trigger detection point.

12. The system of claim 10 wherein said access device comprises a telephone instrument located at a customer premises, and wherein said telephone instrument is responsive to a predetermined manual action to initiate said transmission.

13. The system of claim 1 wherein said control channel comprises a signaling network coupled to said mobile switch.

14. The system of claim 1 wherein said control channel comprises a data link to a base station controller coupled to said mobile switch.

15. The system of claim 1 wherein said wireless device functions as said user terminal when said active connection is to said public switched telephone network.

* * * * *